(12) United States Patent
Burrow

(10) Patent No.: US 10,466,021 B2
(45) Date of Patent: *Nov. 5, 2019

(54) POLYMER CARTRIDGE HAVING A PRIMER INSERT WITH A PRIMER POCKET GROOVE

(71) Applicant: TRUE VELOCITY IP HOLDINGS, LLC, Garland, TX (US)

(72) Inventor: Lonnie Burrow, Carrollton, TX (US)

(73) Assignee: TRUE VELOCITY IP HOLDINGS, LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,001

(22) Filed: Mar. 27, 2018

(65) Prior Publication Data

US 2018/0266803 A1 Sep. 20, 2018

Related U.S. Application Data

(60) Continuation-in-part of application No. 15/406,844, filed on Jan. 16, 2017, now Pat. No. 9,933,241, which
(Continued)

(51) Int. Cl.
*F42B 5/30* (2006.01)
*F42B 5/307* (2006.01)
(Continued)

(52) U.S. Cl.
CPC ............... *F42B 5/30* (2013.01); *B22F 3/004* (2013.01); *B22F 3/225* (2013.01); *B22F 5/06* (2013.01);
(Continued)

(58) Field of Classification Search
CPC .... F42B 5/26; F42B 5/30; F42B 5/307; F42B 5/313; F42B 33/00; F42B 33/001; F42C 19/08; F42C 19/0823; F42C 19/083
(Continued)

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| DE | 16742 C | 1/1882 |

(Continued)

OTHER PUBLICATIONS

AccurateShooter.com Daily Bulletin "New PolyCase Ammunition and Injection-Molded Bullets" Jan. 11, 2015.
(Continued)

*Primary Examiner* — James S Bergin
(74) *Attorney, Agent, or Firm* — Chainey P. Singleton

(57) ABSTRACT

The present invention provides an ammunition cartridge having a primer insert having a top surface opposite a bottom surface and a extraction flange that extends circumferentially about an outer edge of the top surface; a coupling element that extends from the bottom surface, wherein the substantially cylindrical coupling element is adapted to receive a polymer overmolding; a primer recess in the top surface that extends toward the bottom surface, wherein the primer recess comprises a recess bottom and a circular recess side wall; a primer flash aperture through the recess bottom that extends through the bottom surface, wherein the primer flash aperture is adapted to receive a polymer overmolding to form a flash hole; and one or more pads positioned on the recess bottom; a groove in the primer recess positioned around the primer flash aperture to extend at least partially over the recess bottom and adapted to receive a polymer overmolding.

17 Claims, 9 Drawing Sheets

Related U.S. Application Data is a continuation of application No. 14/011,202, filed on Aug. 27, 2013, now Pat. No. 9,546,849, which is a division of application No. 13/292,843, filed on Nov. 9, 2011, now Pat. No. 8,561,543.

(60) Provisional application No. 61/456,664, filed on Nov. 10, 2010.

(51) Int. Cl.

| | |
|---|---|
| *F42B 5/02* | (2006.01) |
| *F42B 33/00* | (2006.01) |
| *F42C 19/08* | (2006.01) |
| *F42B 33/02* | (2006.01) |
| *B22F 3/00* | (2006.01) |
| *B22F 3/22* | (2006.01) |
| *B22F 5/06* | (2006.01) |
| *C22C 14/00* | (2006.01) |
| *C22C 33/02* | (2006.01) |
| *C22C 38/02* | (2006.01) |
| *C22C 38/04* | (2006.01) |
| *C22C 38/18* | (2006.01) |
| *C22C 38/42* | (2006.01) |
| *C22C 38/44* | (2006.01) |
| *C22C 38/48* | (2006.01) |
| *C22C 38/58* | (2006.01) |
| *C04B 35/64* | (2006.01) |
| *F42B 5/313* | (2006.01) |
| *F42B 33/04* | (2006.01) |
| *B22F 3/10* | (2006.01) |

(52) U.S. Cl.
CPC .............. *C04B 35/64* (2013.01); *C22C 14/00* (2013.01); *C22C 33/0257* (2013.01); *C22C 33/0285* (2013.01); *C22C 38/02* (2013.01); *C22C 38/04* (2013.01); *C22C 38/18* (2013.01); *C22C 38/42* (2013.01); *C22C 38/44* (2013.01); *C22C 38/48* (2013.01); *C22C 38/58* (2013.01); *F42B 5/02* (2013.01); *F42B 5/025* (2013.01); *F42B 5/307* (2013.01); *F42B 33/00* (2013.01); *F42B 33/001* (2013.01); *F42B 33/02* (2013.01); *F42C 19/083* (2013.01); *F42C 19/0807* (2013.01); *F42C 19/0823* (2013.01); *B22F 3/1025* (2013.01); *B22F 2998/10* (2013.01); *F42B 5/313* (2013.01); *F42B 33/04* (2013.01)

(58) Field of Classification Search
USPC ............ 102/465, 466, 467, 439, 470; 86/18, 86/19.5, 19.8
See application file for complete search history.

(56) References Cited

U.S. PATENT DOCUMENTS

| | | |
|---|---|---|
| 130,679 A | 8/1872 | Whitmore |
| 159,665 A | 2/1875 | Gauthey |
| 169,807 A | 11/1875 | Hart |
| 462,611 A | 11/1891 | Comte de Sparre |
| 498,856 A | 6/1893 | Overbaugh |
| 640,856 A | 1/1900 | Bailey |
| 662,137 A | 11/1900 | Tellerson |
| 676,000 A | 6/1901 | Henneberg |
| 865,979 A | 9/1907 | Bailey |
| 869,046 A | 10/1907 | Bailey |
| 905,358 A | 12/1908 | Peters |
| 957,171 A | 5/1910 | Loeb |
| 963,911 A | 7/1910 | Loeble |
| 1,060,817 A | 5/1913 | Clyne |
| 1,936,905 A | 11/1933 | Gaidos |
| 1,940,657 A | 12/1933 | Woodford |
| 2,294,822 A | 9/1942 | Norman |
| 2,465,962 A | 3/1949 | Allen et al. |
| 2,654,319 A | 10/1953 | Roske |
| 2,823,611 A | 2/1958 | Thayer |
| 2,862,446 A | 12/1958 | Lars |
| 2,918,868 A | 12/1959 | Lars |
| 3,099,958 A | 8/1963 | Daubenspeck et al. |
| 3,159,701 A | 12/1964 | Herter |
| 3,170,401 A | 2/1965 | Johnson et al. |
| 3,171,350 A | 3/1965 | Metcalf et al. |
| 3,242,789 A | 3/1966 | Woodring |
| 3,292,538 A | 12/1966 | Hans et al. |
| 3,485,170 A | 12/1969 | Scanlon |
| 3,485,173 A | 12/1969 | Morgan |
| 3,609,904 A | 10/1971 | Scanlon |
| 3,659,528 A | 5/1972 | Santala |
| 3,688,699 A | 9/1972 | Horn et al. |
| 3,690,256 A | 9/1972 | Schnitzer |
| 3,745,924 A | 7/1973 | Scanlon |
| 3,749,021 A | 7/1973 | Burgess |
| 3,756,156 A | 9/1973 | Schuster |
| 3,765,297 A | 10/1973 | Skochko et al. |
| 3,768,413 A | 10/1973 | Ramsay |
| 3,797,396 A | 3/1974 | Reed |
| 3,842,739 A | 10/1974 | Scanlon et al. |
| 3,866,536 A | 2/1975 | Greenberg |
| 3,874,294 A | 4/1975 | Hale |
| 3,955,506 A | 5/1976 | Luther et al. |
| 3,977,326 A | 8/1976 | Anderson et al. |
| 3,990,366 A | 11/1976 | Scanlon |
| 4,020,763 A | 5/1977 | Iruretagoyena |
| 4,147,107 A | 4/1979 | Ringdal |
| 4,157,684 A | 6/1979 | Clausser |
| 4,173,186 A | 11/1979 | Dunham |
| 4,187,271 A | 2/1980 | Rolston et al. |
| 4,228,724 A | 10/1980 | Leich |
| 4,475,435 A | 10/1984 | Mantel |
| 4,598,445 A | 7/1986 | O'Connor |
| 4,614,157 A | 9/1986 | Grelle et al. |
| 4,679,505 A | 7/1987 | Reed |
| 4,718,348 A | 1/1988 | Ferrigno |
| 4,719,859 A | 1/1988 | Ballreich et al. |
| 4,726,296 A | 2/1988 | Leshner et al. |
| 4,867,065 A | 9/1989 | Kaltmann et al. |
| 5,021,206 A | 6/1991 | Stoops |
| 5,033,386 A | 7/1991 | Vatsvog |
| 5,063,853 A | 11/1991 | Bilgeri |
| 5,090,327 A | 2/1992 | Bilgeri |
| 5,151,555 A | 9/1992 | Vatsvog |
| 5,165,040 A | 11/1992 | Andersson et al. |
| 5,237,930 A | 8/1993 | Belanger et al. |
| 5,247,888 A | 9/1993 | Conil |
| 5,259,288 A | 11/1993 | Vatsvog |
| 5,265,540 A | 11/1993 | Ducros et al. |
| 5,433,148 A | 7/1995 | Barratault et al. |
| 5,535,495 A | 7/1996 | Gutowski |
| 5,563,365 A | 10/1996 | Dineen et al. |
| 5,770,815 A | 6/1998 | Watson |
| 5,798,478 A | 8/1998 | Beal |
| 5,950,063 A | 9/1999 | Hens et al. |
| 5,961,200 A | 10/1999 | Friis |
| 5,969,288 A | 10/1999 | Baud |
| 6,004,682 A | 12/1999 | Rackovan et al. |
| 6,048,379 A | 4/2000 | Bray et al. |
| 6,070,532 A | 6/2000 | Halverson |
| 6,272,993 B1 | 8/2001 | Cook et al. |
| 6,283,035 B1 | 9/2001 | Olson et al. |
| 6,357,357 B1 | 3/2002 | Glasser |
| 6,375,971 B1 | 4/2002 | Hansen |
| 6,450,099 B1 | 9/2002 | Desgland |
| 6,460,464 B1 | 10/2002 | Attarwala |
| 6,523,476 B1 | 2/2003 | Riess et al. |
| 6,649,095 B2 | 11/2003 | Buja |
| 6,672,219 B2 | 1/2004 | Mackerell et al. |
| 6,708,621 B1 | 3/2004 | Forichon-Chaumet et al. |
| 6,752,084 B1 | 6/2004 | Husseini et al. |
| 6,810,816 B2 | 11/2004 | Rennard |

(56) References Cited

U.S. PATENT DOCUMENTS

| | | |
|---|---|---|
| 6,840,149 B2 | 1/2005 | Beal |
| 6,845,716 B2 | 1/2005 | Husseini et al. |
| 7,000,547 B2 | 2/2006 | Amick |
| 7,014,284 B2 | 3/2006 | Morton et al. |
| 7,032,492 B2 | 4/2006 | Meshirer |
| 7,056,091 B2 | 6/2006 | Powers |
| 7,059,234 B2 | 6/2006 | Husseini |
| 7,165,496 B2 | 1/2007 | Reynolds |
| 7,204,191 B2 | 4/2007 | Wiley et al. |
| 7,213,519 B2 | 5/2007 | Wiley et al. |
| 7,231,519 B2 | 6/2007 | Joseph et al. |
| 7,232,473 B2 | 6/2007 | Elliott |
| 7,299,750 B2 | 11/2007 | Schikora et al. |
| 7,353,756 B2 | 4/2008 | Leasure |
| 7,380,505 B1 | 6/2008 | Shiery |
| 7,383,776 B2 | 6/2008 | Amick |
| 7,392,746 B2 | 7/2008 | Hansen |
| 7,441,504 B2 | 10/2008 | Husseini et al. |
| 7,461,597 B2 | 12/2008 | Brunn |
| 7,585,166 B2 | 9/2009 | Buja |
| 7,610,858 B2 * | 11/2009 | Chung .................... F42B 5/313 102/466 |
| 7,750,091 B2 | 7/2010 | Maljkovic et al. |
| 7,841,279 B2 | 11/2010 | Reynolds et al. |
| 7,930,977 B2 | 4/2011 | Klein |
| 8,007,370 B2 | 8/2011 | Hirsch et al. |
| 8,056,232 B2 | 11/2011 | Patel et al. |
| 8,156,870 B2 | 4/2012 | South |
| 8,201,867 B2 | 6/2012 | Thomeczek |
| 8,206,522 B2 | 6/2012 | Sandstrom et al. |
| 8,240,252 B2 | 8/2012 | Maljkovic et al. |
| 8,408,137 B2 | 4/2013 | Battaglia |
| 8,443,729 B2 | 5/2013 | Mittelstaedt |
| 8,443,730 B2 * | 5/2013 | Padgett .................... F42B 5/313 102/466 |
| 8,511,233 B2 | 8/2013 | Nilsson |
| 8,522,684 B2 | 9/2013 | Davies et al. |
| 8,540,828 B2 | 9/2013 | Busky et al. |
| 8,561,543 B2 * | 10/2013 | Burrow .................... F42B 5/307 102/467 |
| 8,573,126 B2 * | 11/2013 | Klein ....................... F42B 5/36 102/430 |
| 8,641,842 B2 | 2/2014 | Hafner et al. |
| 8,689,696 B1 | 4/2014 | Seeman et al. |
| 8,763,535 B2 | 7/2014 | Padgett |
| 8,790,455 B2 | 7/2014 | Borissov et al. |
| 8,807,008 B2 | 8/2014 | Padgett et al. |
| 8,813,650 B2 | 8/2014 | Maljkovic et al. |
| D715,888 S | 10/2014 | Padgett |
| 8,850,985 B2 | 10/2014 | Maljkovic et al. |
| 8,857,343 B2 | 10/2014 | Marx |
| 8,869,702 B2 | 10/2014 | Padgett |
| 8,875,633 B2 | 11/2014 | Padgett |
| 8,893,621 B1 | 11/2014 | Escobar |
| 8,978,559 B2 | 3/2015 | Davies et al. |
| 9,003,973 B1 | 4/2015 | Padgett |
| 9,032,855 B1 | 5/2015 | Foren et al. |
| 9,091,516 B2 * | 7/2015 | Davies .................... F42B 5/307 |
| 9,103,641 B2 | 8/2015 | Nielson et al. |
| 9,157,709 B2 | 10/2015 | Nuetzman et al. |
| 9,170,080 B2 | 10/2015 | Poore et al. |
| 9,182,204 B2 | 11/2015 | Maljkovic et al. |
| 9,188,412 B2 | 11/2015 | Maljkovic et al. |
| 9,200,157 B2 | 12/2015 | El-Hibri et al. |
| 9,200,880 B1 | 12/2015 | Foren et al. |
| 9,212,876 B1 | 12/2015 | Kostka et al. |
| 9,212,879 B2 | 12/2015 | Whitworth |
| 9,213,175 B2 | 12/2015 | Arnold |
| 9,254,503 B2 | 2/2016 | Ward |
| 9,255,775 B1 | 2/2016 | Rubin |
| 9,329,004 B2 | 5/2016 | Pace |
| 9,335,137 B2 | 5/2016 | Maljkovic et al. |
| 9,337,278 B1 | 5/2016 | Gu et al. |
| 9,347,457 B2 | 5/2016 | Ahrens et al. |
| 9,366,512 B2 | 6/2016 | Burczynski et al. |
| 9,377,278 B2 | 6/2016 | Rubin |
| 9,389,052 B2 | 7/2016 | Conroy et al. |
| 9,395,165 B2 | 7/2016 | Maljkovic et al. |
| D764,624 S | 8/2016 | Masinelli |
| D765,214 S | 8/2016 | Padgett |
| 9,429,407 B2 * | 8/2016 | Burrow .................... F42B 5/307 |
| 9,441,930 B2 * | 9/2016 | Burrow .................... F42B 5/307 |
| 9,453,714 B2 | 9/2016 | Bosarge et al. |
| 9,500,453 B2 | 11/2016 | Schluckebier et al. |
| 9,506,735 B1 * | 11/2016 | Burrow .................. F42C 19/083 |
| 9,513,096 B2 * | 12/2016 | Burrow .................... F42B 5/307 |
| 9,518,810 B1 * | 12/2016 | Burrow .................. F42C 19/083 |
| 9,523,563 B1 * | 12/2016 | Burrow .................. F42C 19/083 |
| 9,528,799 B2 | 12/2016 | Maljkovic |
| 9,546,849 B2 * | 1/2017 | Burrow .................... F42B 5/307 |
| 9,551,557 B1 * | 1/2017 | Burrow .................. F42C 19/083 |
| D778,391 S | 2/2017 | Burrow |
| D778,393 S | 2/2017 | Burrow |
| D778,394 S | 2/2017 | Burrow |
| D778,395 S | 2/2017 | Burrow |
| D779,024 S | 2/2017 | Burrow |
| 9,587,918 B1 | 3/2017 | Burrow |
| 9,599,443 B2 * | 3/2017 | Padgett .................... F42B 5/313 |
| 9,625,241 B2 | 4/2017 | Neugebauer |
| 9,631,907 B2 * | 4/2017 | Burrow .................... F42B 5/307 |
| 9,644,930 B1 * | 5/2017 | Burrow .................. F42B 33/001 |
| 9,658,042 B2 | 5/2017 | Emary |
| 9,683,818 B2 | 6/2017 | Lemke et al. |
| 9,709,368 B2 | 7/2017 | Mahnke |
| 9,759,554 B2 | 9/2017 | Ng et al. |
| 9,784,667 B2 | 10/2017 | Lukay et al. |
| 9,835,423 B2 * | 12/2017 | Burrow .................... F42B 5/30 |
| 9,835,427 B2 * | 12/2017 | Burrow .................. F42C 19/083 |
| 9,857,151 B2 | 1/2018 | Dionne et al. |
| 9,869,536 B2 * | 1/2018 | Burrow .................. F42B 33/001 |
| 9,885,551 B2 * | 2/2018 | Burrow .................... F42B 5/307 |
| 9,921,040 B2 | 3/2018 | Rubin |
| 9,927,219 B2 * | 3/2018 | Burrow .................. F42C 19/083 |
| 9,933,241 B2 * | 4/2018 | Burrow .................. F42B 33/00 |
| 9,939,236 B2 | 4/2018 | Drobockyi et al. |
| 9,964,388 B1 * | 5/2018 | Burrow .................... F42B 5/313 |
| 10,240,905 B2 * | 3/2019 | Burrow .................... F42B 5/307 |
| 2003/0131751 A1 | 7/2003 | Mackerell et al. |
| 2006/0260500 A1 | 11/2006 | Engel et al. |
| 2007/0056343 A1 | 3/2007 | Cremonesi |
| 2009/0314178 A1 | 12/2009 | South |
| 2010/0275804 A1 | 11/2010 | Trivette |
| 2012/0011219 A1 | 1/2012 | Zhang et al. |
| 2012/0037029 A1 | 2/2012 | Klement |
| 2012/0111219 A1 | 5/2012 | Burrow |
| 2012/0180688 A1 | 7/2012 | Padgett |
| 2012/0199033 A1 | 8/2012 | Bybee et al. |
| 2013/0014665 A1 | 1/2013 | Maljkovic et al. |
| 2014/0060372 A1 | 3/2014 | Padgett |
| 2014/0260925 A1 | 9/2014 | Beach et al. |
| 2015/0226220 A1 | 8/2015 | Bevington |
| 2015/0241183 A1 | 8/2015 | Padgett et al. |
| 2015/0241184 A1 | 8/2015 | Burrow |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0102030 A1 | 4/2016 | Coffey et al. |
| 2016/0209186 A1 | 7/2016 | Hajjar |
| 2016/0245626 A1 | 8/2016 | Drieling et al. |
| 2016/0349023 A1 | 12/2016 | Burrow |
| 2016/0349028 A1 | 12/2016 | Burrow |
| 2016/0356581 A1 | 12/2016 | Burrow |
| 2016/0356588 A1 | 12/2016 | Burrow |
| 2016/0377399 A1 | 12/2016 | Burrow |
| 2017/0080498 A1 | 3/2017 | Burrow |
| 2017/0082409 A1 | 3/2017 | Burrow |
| 2017/0082411 A1 | 3/2017 | Burrow |
| 2017/0089673 A1 | 3/2017 | Burrow |

(56) References Cited

U.S. PATENT DOCUMENTS

| | | |
|---|---|---|
| 2017/0089674 A1 | 3/2017 | Burrow |
| 2017/0089675 A1 | 3/2017 | Burrow |
| 2017/0089679 A1 | 3/2017 | Burrow |
| 2017/0261294 A1 | 9/2017 | Riess |
| 2018/0066925 A1 | 3/2018 | Skowron et al. |
| 2018/0245898 A1* | 8/2018 | Burrow .................. F42B 5/307 |

FOREIGN PATENT DOCUMENTS

| | | |
|---|---|---|
| EP | 2625486 A4 | 8/2017 |
| FR | 1412414 A | 10/1965 |
| GB | 783023 A | 9/1957 |
| WO | 0034732 | 6/2000 |
| WO | 2007014024 A2 | 2/2007 |
| WO | 2012047615 A1 | 4/2012 |
| WO | 2012097320 A1 | 7/2012 |
| WO | 2012097317 A3 | 11/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |

OTHER PUBLICATIONS

Korean Intellectual Property Office (ISA), International Search Report and Written Opinion for PCT/US2011/062781 dated Nov. 30, 2012, 16 pp.
Korean Intellectual Property Office (ISA), International Search Report and Written Opinion for PCT/US2015/038061 dated Sep. 21, 2015, 28 pages.

* cited by examiner

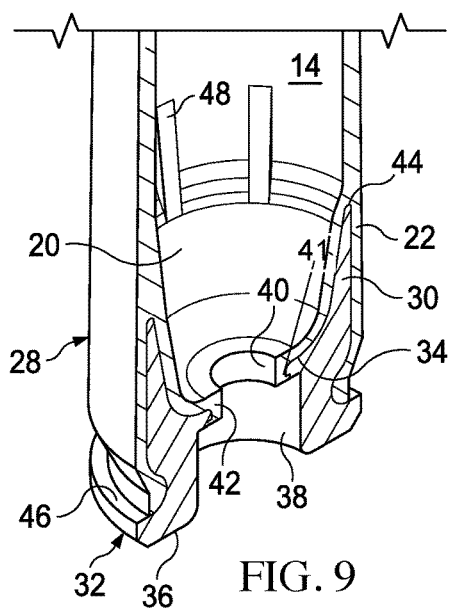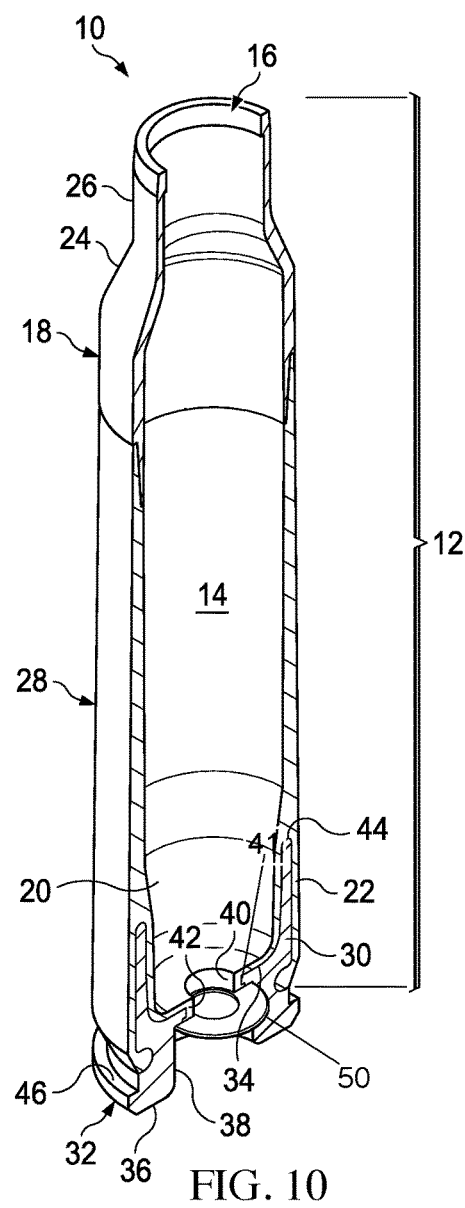

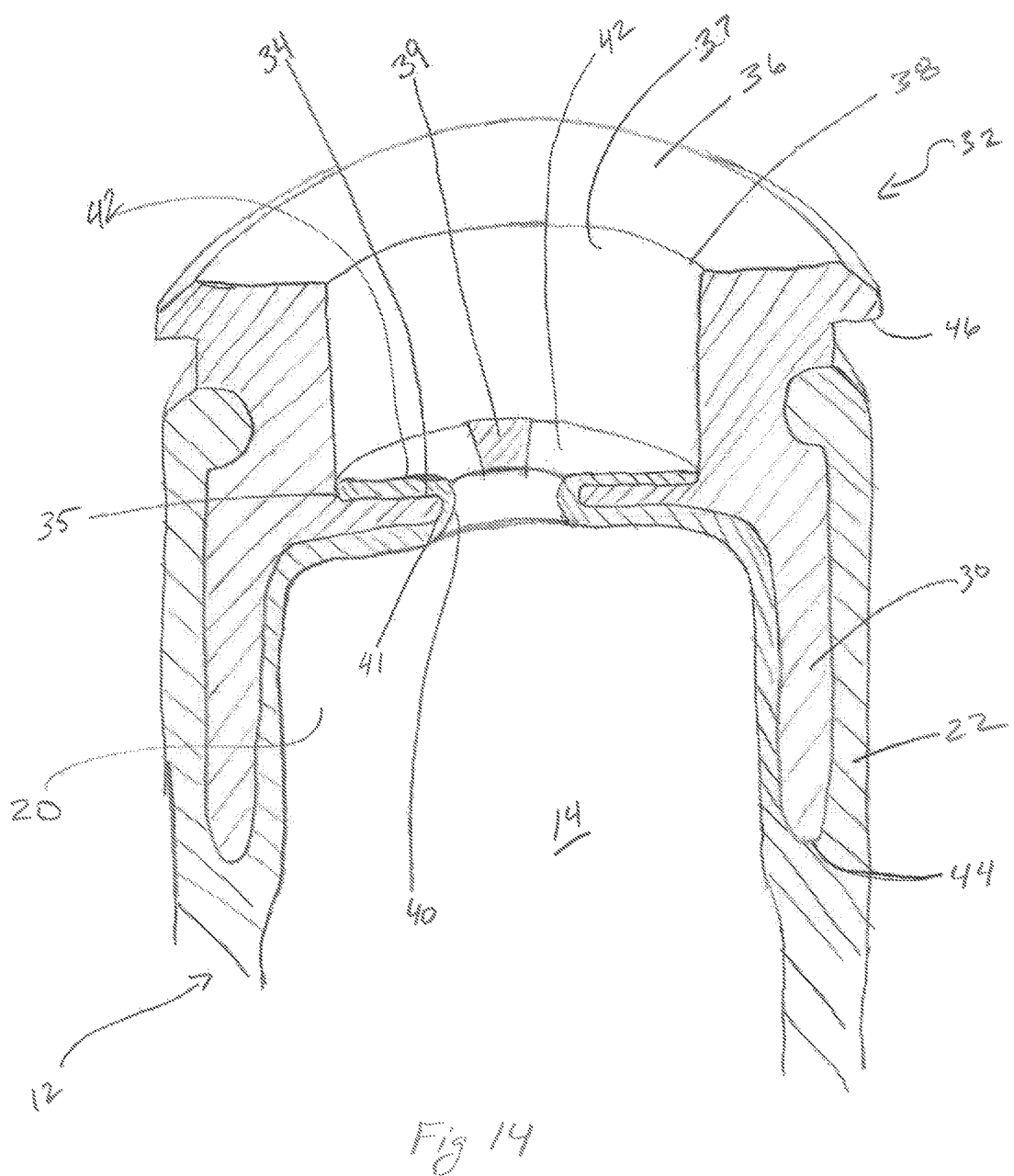

POLYMER CARTRIDGE HAVING A PRIMER INSERT WITH A PRIMER POCKET GROOVE

CROSS-REFERENCE TO RELATED APPLICATIONS

This application is a Continuation Application of co-pending U.S. patent application Ser. No. 15/406,844 filed on Jan. 16, 2017, which is a continuation application of U.S. patent application Ser. No. 14/011,202 filed on Aug. 27, 2013 now U.S. Pat. No. 9,546,849, which is a division of U.S. patent application Ser. No. 13/292,843 filed on Nov. 9, 2011 now U.S. Pat. No. 8,561,543 issued Oct. 13, 2013, which claims the benefit of U.S. Provisional Patent Application Ser. No. 61/456,664, filed Nov. 10, 2010, the contents of each are hereby incorporated by reference in their entirety.

TECHNICAL FIELD OF THE INVENTION

The present invention relates in general to the field of ammunition, specifically to compositions of matter and methods of making and using polymeric ammunition, cartridges, and primer inserts.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with lightweight polymer cartridge casing ammunition. Conventional ammunition cartridge casings for rifles and machine guns, as well as larger caliber weapons, are made from brass, which is heavy, expensive, and potentially hazardous. There exists a need for an affordable lighter weight replacement for brass ammunition cartridge cases that can increase mission performance and operational capabilities. Lightweight polymer cartridge casing ammunition must meet the reliability and performance standards of existing fielded ammunition and be interchangeable with brass cartridge casing ammunition in existing weaponry. Reliable cartridge casings manufacture requires uniformity (e.g., bullet seating, bullet-to-casing fit, casing strength, etc.) from one cartridge to the next in order to obtain consistent pressures within the casing during firing prior to bullet and casing separation to create uniformed ballistic performance. Plastic cartridge casings have been known for many years but have failed to provide satisfactory ammunition that could be produced in commercial quantities with sufficient safety, ballistic, handling characteristics, and survive physical and natural conditions to which it will be exposed during the ammunition's intended life cycle; however, these characteristics have not been achieved.

For example, U.S. patent application Ser. No. 11/160,682 discloses a base for a cartridge casing body for an ammunition article, the base having an ignition device; an attachment device at one end thereof, the attachment device being adapted to the base to a cartridge casing body; wherein the base is made from plastic, ceramic, or a composite material.

U.S. Pat. No. 7,610,858 discloses an ammunition cartridge assembled from a substantially cylindrical polymeric cartridge casing body defining a casing headspace with an open projectile-end and an end opposing the projectile-end, wherein the casing body has a substantially cylindrical injection molded polymeric bullet-end component with opposing first and second ends, the first end of which is the projectile-end of the casing body and the second end has a male or female coupling element; and a cylindrical polymeric middle body component with opposing first and second ends, wherein the first end has a coupling element that is a mate for the projectile-end coupling element and joins the first end of the middle body component to the second end of the bullet-end component, and the second end is the end of the casing body opposite the projectile end and has a male or female coupling element; and a cylindrical cartridge casing head-end component with an essentially closed base end with a primer hole opposite an open end with a coupling element that is a mate for the coupling element on the second end of the middle body and joins the second end of the middle body component to the open end of the head-end component; wherein the middle body component is formed from a material more ductile than the material head-end component is formed from but equal or less ductile than the material the bullet-end component is formed from. Methods for assembling ammunition cartridges and ammunition cartridges having the headspace length larger than the corresponding headspace length of the chamber of the intended weapon measured at the same basic diameter for the cartridge casing without being so large as to jam the weapon or otherwise interfere with its action are also disclosed.

Shortcomings of the known methods of producing plastic or substantially plastic ammunition include the possibility of the projectile being pushed into the cartridge casing, the bullet pull being too light such that the bullet can fall out, the bullet pull being too insufficient to create sufficient chamber pressure, the bullet pull not being uniform from round to round, and portions of the cartridge casing breaking off upon firing causing the weapon to jam or damage or danger when subsequent rounds are fired or when the casing portions themselves become projectiles. To overcome the above shortcomings, improvements in cartridge case design and performance polymer materials are needed.

BRIEF SUMMARY OF THE INVENTION

The present invention provides a polymeric ammunition cartridge comprising: a primer insert comprising: a top surface opposite a bottom surface and a extraction flange that extends circumferentially about an outer edge of the top surface; a coupling element that extends from the bottom surface, wherein the substantially cylindrical coupling element is adapted to receive a polymer overmolding; a primer recess in the top surface that extends toward the bottom surface, wherein the primer recess comprises a recess bottom and a circular recess side wall; a primer flash aperture through the recess bottom that extends through the bottom surface, wherein the primer flash aperture is adapted to receive a polymer overmolding to form a flash hole; and one or more pads positioned on the recess bottom; a groove in the primer recess positioned around the primer flash aperture to extend at least partially over the recess bottom and adapted to receive a polymer overmolding; a substantially cylindrical polymeric middle body extending about the three piece primer insert, wherein the substantially cylindrical polymeric middle body comprises: a substantially cylindrical polymeric bullet-end coupling element at a first end of the substantially cylindrical polymeric middle body opposite a substantially cylindrical polymeric coupling end connected by a powder chamber, wherein the substantially cylindrical polymeric coupling end extends over the substantially cylindrical coupling element and covers an circumferential surface of the primer flash hole aperture; and a substantially cylindrical polymeric bullet-end upper portion comprising a bullet-end coupling element connected to the substantially cylindrical polymeric bullet-end coupling element opposite a projectile aperture adapted to engage a bullet. The one or more pads may be 3 pads. The one or more pads may be 2-6 pads. The one or more pads may be positioned to align with the primer. The one or more pads may be positioned to align with an anvil of the primer. The one or more pads are shaped to support an anvil of the primer.

The polymeric ammunition cartridge may be a caliber selected from .223, .243, .25-06, .270, .300, .308, .338, .30-30, .30-06, .45-70 or .50-90, 50 caliber, 45 caliber, 380 caliber or 38 caliber, 5.56 mm, 6 mm, 7 mm, 7.62 mm, 8 mm, 9 mm, 10 mm, or 12.7 mm. The polymeric ammunition cartridge may be a caliber selected from .308, .338, 50 caliber, 5.56 mm, 7.62 mm, or 12.7 mm. The substantially cylindrical polymeric middle body may be formed from a ductile polymer, a nylon polymer or a fiber-reinforced polymeric composite. The substantially cylindrical polymeric bullet-end upper portion may be a ductile polymer, a nylon polymer or a fiber-reinforced polymeric composite. The substantially cylindrical polymeric middle body may be a polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers. The substantially cylindrical polymeric bullet-end upper portion may be a polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers. The substantially cylindrical polymeric bullet-end and the substantially cylindrical polymeric bullet-end upper portion may be welded or bonded together. The projectile aperture further may be a mechanical interlock adapted to mate to a groove on a bullet. The substantially cylindrical polymeric bullet-end coupling element may be welded or bonded to the substantially cylindrical polymeric bullet-end upper portion. The upper primer insert portion, the middle primer insert portion, the lower primer insert portion or a combination thereof independently may be a polymer, a metal, an alloy, or a ceramic alloy. The upper primer insert portion, the middle primer insert portion, the lower primer insert portion or a combination thereof may be the same material or different materials. The upper primer insert portion, the middle primer insert portion, the lower primer insert portion or a combination thereof may be different polymers, different metals, different alloys, or different ceramic compositions. The upper primer insert portion, the middle primer insert portion, the lower primer insert portion or a combination thereof independently may be steel, nickel, chromium, copper, carbon, iron, stainless steel or brass. upper primer insert portion, the middle primer insert portion, the lower primer insert portion or a combination thereof may be 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel or $Ti_6Al_4V$.

The present invention provides a primer insert for use in a polymeric ammunition cartridge includes atop surface opposite a bottom surface and a extraction flange that extends circumferentially about an outer edge of the top surface; a coupling element that extends from the bottom surface, wherein the substantially cylindrical coupling element is adapted to receive a polymer overmolding; a primer recess in the top surface that extends toward the bottom surface, wherein the primer recess comprises a recess bottom and a circular recess side wall; a primer flash aperture through the recess bottom that extends through the bottom surface, wherein the primer flash aperture is adapted to receive a polymer overmolding to form a flash hole; and one or more pads positioned on the recess bottom; a groove in the primer recess positioned around the primer flash aperture to extend at least partially over the recess bottom and adapted to receive a polymer overmolding.

In one embodiment, the one or more pads comprise 3 pads. In another embodiment the one or more pads comprise 2-6 pads. In another embodiment the one or more pads are positioned to align with the primer. In another embodiment the one or more pads are positioned to align with an anvil of the primer. In another embodiment the one or more pads are shaped to support an anvil of the primer. The coupling element comprises an inner surface adapted to receive a polymer overmolding and an outer surface adapted to receive a polymer overmolding. The primer insert includes an outer molding groove that extends circumferentially about an outer edge of the top surface. The primer insert has a caliber selected from .223, .243, .25-06, .270, .300, .308, .338, .30-30, .30-06, .45-70 or .50-90, 50 caliber, 45 caliber, 380 caliber or 38 caliber, 5.56 mm, 6 mm, 7 mm, 7.62 mm, 8 mm, 9 mm, 10 mm, or 12.7 mm. The primer insert is a 5.56 mm, 7.62 mm, .223, 308, 338, 12.7 mm, and .50 caliber primer insert. The primer insert comprises a metal, an alloy, a polymer or a ceramic alloy. The primer insert comprises steel, nickel, chromium, copper, carbon, iron, stainless steel or brass. The primer insert comprises a 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel. The primer insert comprises a $Ti_6Al_4V$. The primer insert comprises a groove texture.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which:

FIG. 9 depicts a side, cross-sectional view of a portion of the polymeric cartridge case displaying ribs according to one embodiment of the present invention;

FIG. 10 depicts a side, cross-sectional view of a polymeric cartridge case having a diffuser according to one embodiment of the present invention;

FIG. 14 depicts an elevated, cross-sectional view of a portion of the polymeric cartridge case according to one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Reliable cartridge manufacture requires uniformity from one cartridge to the next in order to obtain consistent ballistic performance. Among other considerations, proper bullet seating and bullet-to-casing fit is required. In this manner, a desired pressure develops within the casing during firing prior to bullet and casing separation. Historically, bullets employ a cannelure, which is a slight annular depression formed in a surface of the bullet at a location determined to be the optimal seating depth for the bullet. In this manner, a visual inspection of a cartridge could determine whether or not the bullet is seated at the proper depth. Once the bullet is inserted into the casing to the proper depth, one of two standard procedures is incorporated to lock the bullet in its proper location. One method is the crimping of the entire end of the casing into the cannelure. A second method does not crimp the casing end; rather the bullet is pressure fitted into the casing.

The polymeric ammunition cartridges of the present invention are of a caliber typically carried by soldiers in combat for use in their combat weapons. The present invention is not limited to the described caliber and is believed to be applicable to other calibers as well. This includes various small and medium caliber munitions, including 5.56 mm, 7.62 mm and .50 caliber ammunition cartridges, as well as medium/small caliber ammunition such as 380 caliber, 38 caliber, 9 mm, 10 mm, 20 mm, 25 mm, 30 mm, 40 mm, 45 caliber and the like. The cartridges, therefore, are of a caliber between about 0.05 and about 5 inches. Thus, the present invention is also applicable to the sporting goods industry for use by hunters and target shooters.

Figure 1:
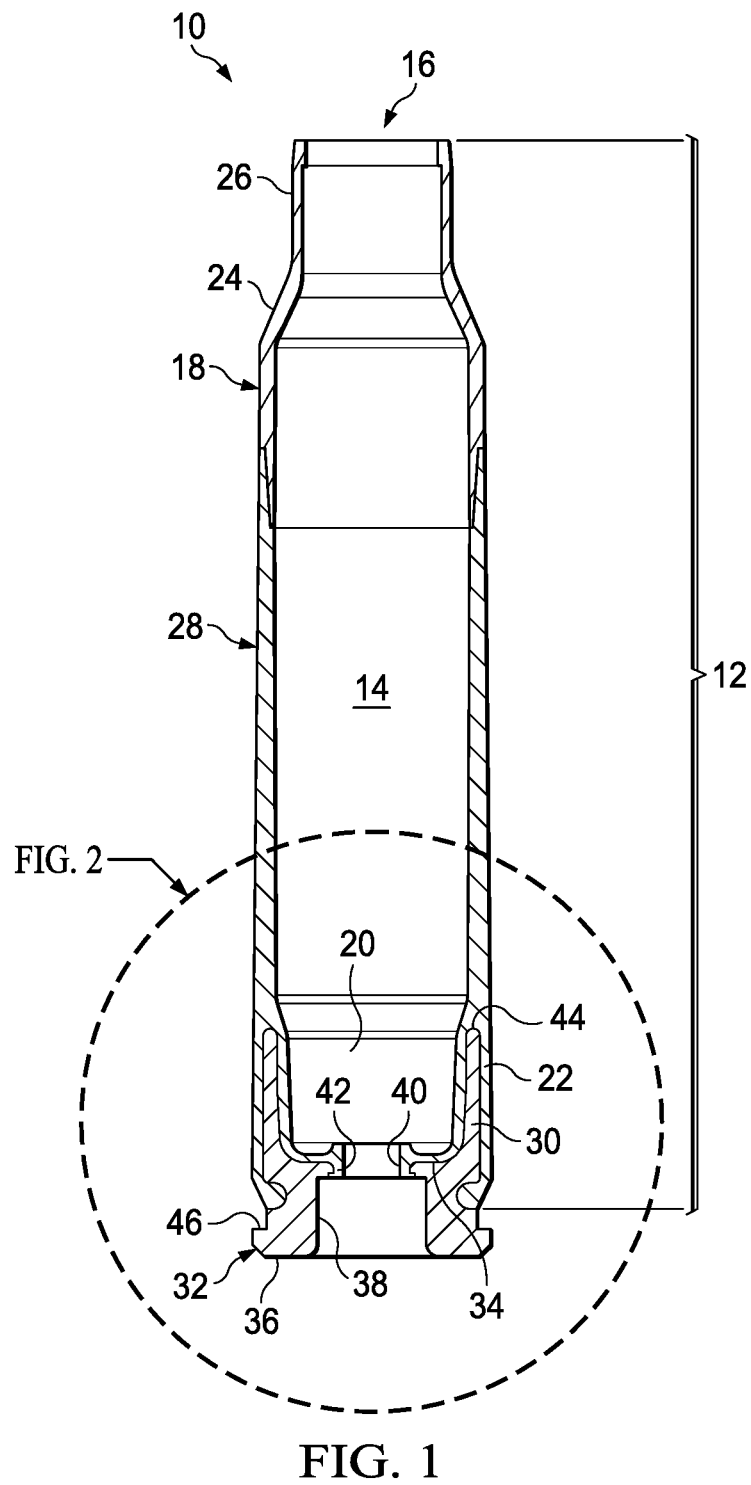
FIG. 1 depicts a side, cross-sectional view of a polymeric cartridge case according to one embodiment of the present invention.

FIG. 1 depicts a side, cross-sectional view of a polymeric cartridge case according to one embodiment of the present invention. A cartridge 10 suitable for use with high velocity rifles is shown manufactured with a polymer casing 12 showing a powder chamber 14 with projectile (not shown) inserted into the forward end opening 16. Polymer casing 12 has a substantially cylindrical open-ended polymeric bullet-end 18 extending from forward end opening 16 rearward to opposite end 20. The bullet-end component 18 may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26. The bullet-end component typically has a wall thickness between about 0.003 and about 0.200 inches and more preferably between about 0.005 and more preferably between about 0.150 inches about 0.010 and about 0.050 inches.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The middle body component extends from a forward end opening 16 to coupling element 22. The middle body component typically has a wall thickness between about 0.003 and about 0.200 inches and more preferably between about 0.005 and more preferably between about 0.150 inches about 0.010 and about 0.050 inches.

The bullet-end 16, middle body 18 and bottom surface 34 define the interior of powder chamber 14 in which the powder charge (not shown) is contained. The interior volume of powder chamber 14 may be varied to provide the volume necessary for complete filling of the chamber 14 by the propellant chosen so that a simplified volumetric measure of propellant can be utilized when loading the cartridge. Either a particulate or consolidated propellant can be used.

The substantially cylindrical insert 32 also has a flange 46 cut therein and a primer recess 38 formed therein for ease of insertion of the primer (not shown). The primer recess 38 is sized so as to receive the primer (not shown) in an interference fit during assembly. A primer flash hole 40 communicates through the bottom surface 34 of substantially cylindrical insert 32 into the powder chamber 14 so that upon detonation of primer (not shown) the powder in powder chamber 14 will be ignited.

Projectile (not shown) is held in place within chamber case neck 26 at forward opening 16 by an interference fit. Mechanical crimping of the forward opening 16 can also be applied to increase the bullet pull force. The bullet (not shown) may be inserted into place following the completion of the filling of powder chamber 14. Projectile (not shown) can also be injection molded directly onto the forward opening 16 prior to welding or bonding together using solvent, adhesive, spin-welding, vibration-welding, ultrasonic-welding or laser-welding techniques. The welding or bonding increases the joint strength so the casing can be extracted from the hot gun casing after firing at the cook-off temperature.

The bullet-end and bullet components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature. An optional first and second annular grooves (cannelures) may be provided in the bullet-end in the interlock surface of the male coupling element to provide a snap-fit between the two components. The cannelures formed in a surface of the bullet at a location determined to be the optimal seating depth for the bullet. Once the bullet is inserted into the casing to the proper depth to lock the bullet in its proper location. One method is the crimping of the entire end of the casing into the cannelures.

The bullet-end and middle body components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature.

Figure 2:
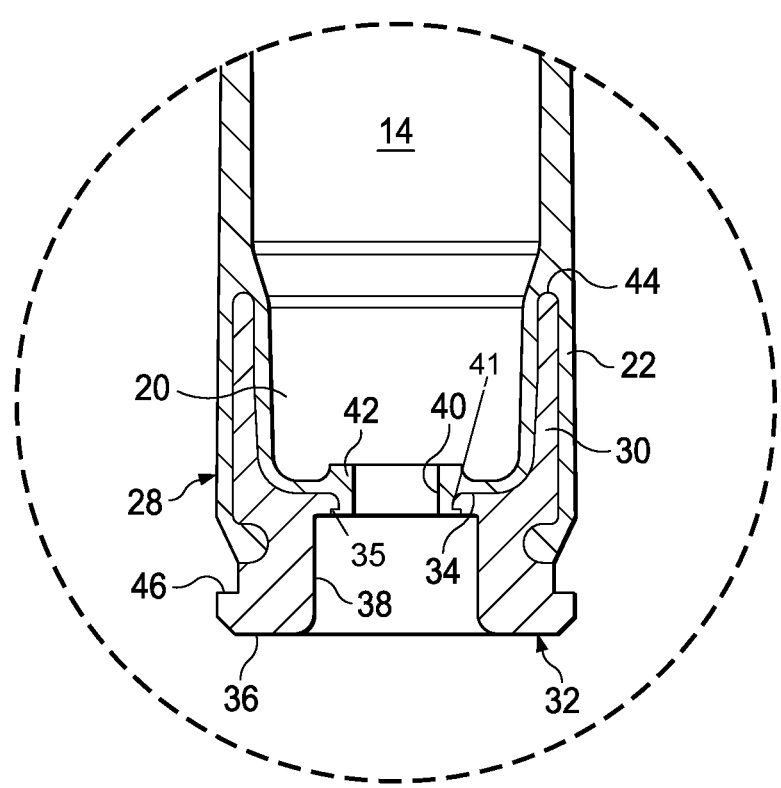
FIG. 2 depicts a side, cross-sectional view of a portion of the polymeric cartridge case according to one embodiment of the present invention.

FIG. 2 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends from 5 to 25% of the distance from the flash hole aperture 41 to the side of the primer recess 38. The groove 35 may be of any depth in the primer recess 38 and may extend away from the flash hole aperture 41 toward the wall of the primer recess 38. In addition, the groove 35 may be textured to further grip the overmolding. The texture may be grooves, slots, squares, knurled, hatched, etched or other known surface texturing. The texture may be of any depth, width or spacing being regular or irregular. The texturing may be combinations of textures and/or textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 3:
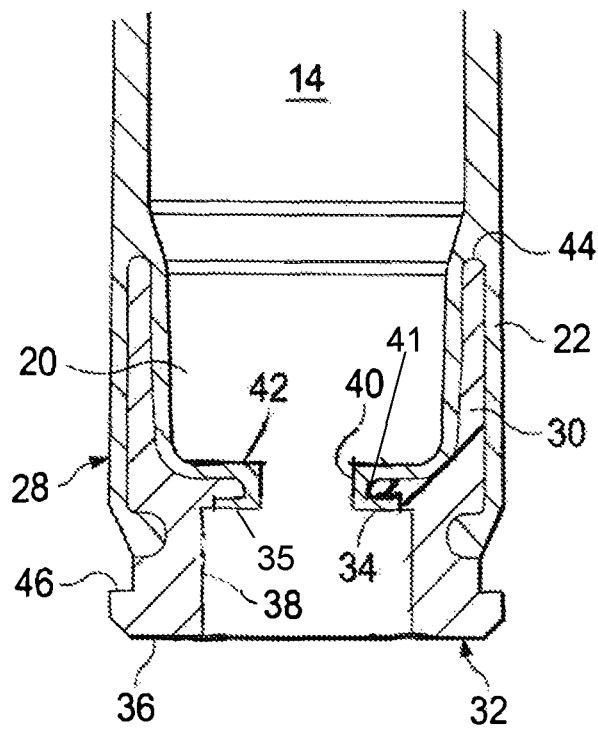
FIG. 3 depicts a side, cross-sectional view of a portion of the polymeric cartridge case according to one embodiment of the present invention.

FIG. 3 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends from 26 to 75% of the distance from the flash hole aperture 41 to the side of the primer recess 38. The groove 35 may be of any depth in the primer recess 38 and may extend away from the flash hole aperture 41 toward the wall of the primer recess 38. In addition, the groove 35 may be textured to further grip the overmolding. The texture may be grooves, slots, squares, knurled, hatched, etched or other known surface texturing. The texture may be of any depth, width or spacing being regular or irregular. The texturing may be combinations of textures and/or textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 4:
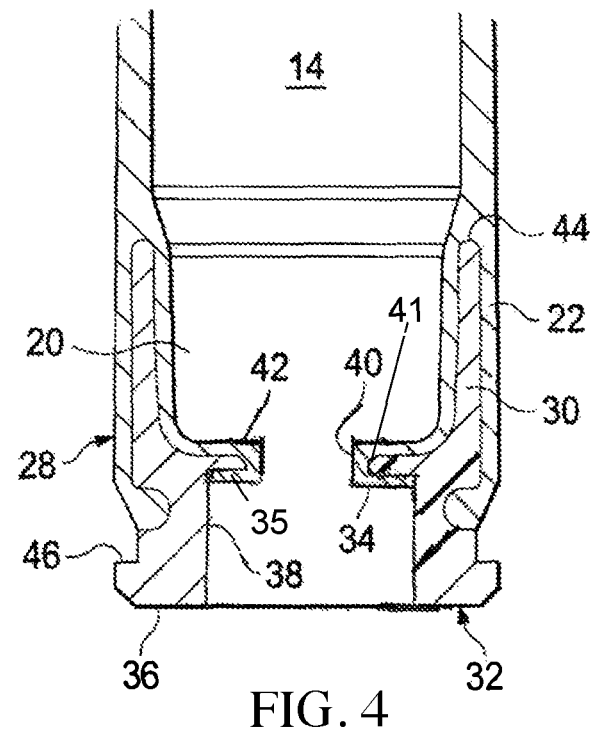
FIG. 4 depicts a side, cross-sectional view of a portion of the polymeric cartridge case according to one embodiment of the present invention.

FIG. 4 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends from 75 to 100% of the distance from the flash hole aperture 41 to the side of the primer recess 38. The groove 35 may be of any depth in the primer recess 38 and may extend away from the flash hole aperture 41 toward the wall of the primer recess 38. In addition, the groove 35 may be textured to further grip the overmolding. The texture may be grooves, slots, squares, knurled, hatched, etched or other known surface texturing. The texture may be of any depth, width or spacing being regular or irregular. The texturing may be combinations of textures and/or textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 5:
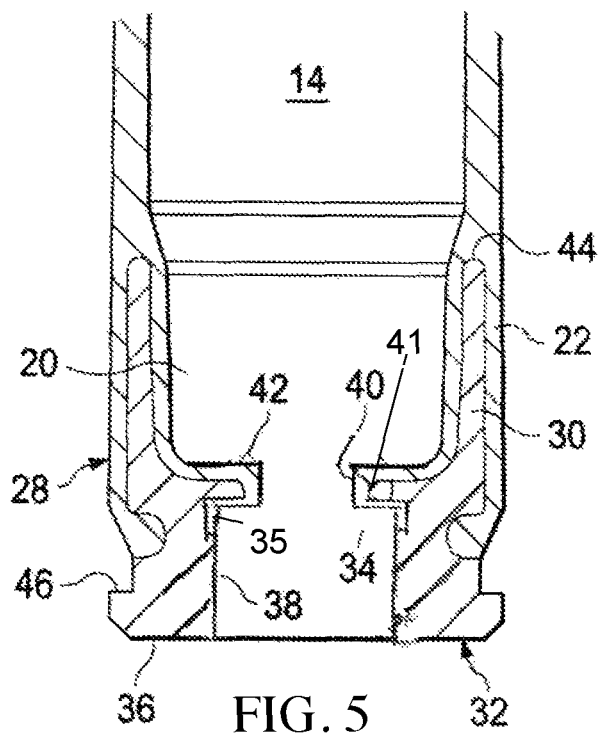
FIG. 5 depicts a side, cross-sectional view of a portion of the polymeric cartridge case according to one embodiment of the present invention.

FIG. 5 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends the length of the bottom of the primer recess and extends to at least a portion of the sidewall of the primer recess. The groove 35 may extend from 2 to 25% of the distance from the bottom of the primer recess to the top surface 36. The groove 35 may be of any depth and may be of equal or varying depth along its length or may be angled, arced, segmented (positive or negative) or other variations over a portion, segments, or regions of the groove 35. In addition, the groove 35 may be textured to further grip the overmolding. The texture may be grooves, slots, squares, knurled, hatched, etched, indentions, or other known surface texturing. The texture may be of any depth, width or spacing being regular or irregular. The texturing may be combinations of textures and/or only textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 6:
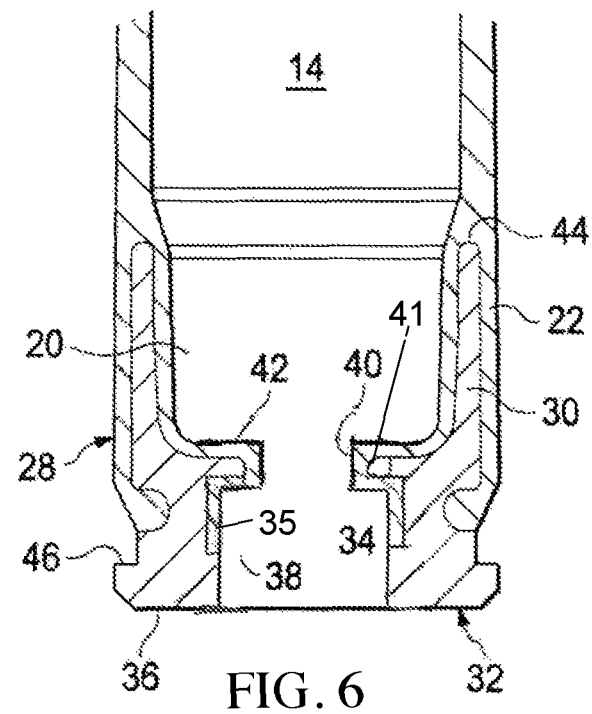
FIG. 6 depicts a side, cross-sectional view of a portion of the polymeric cartridge case according to one embodiment of the present invention.

FIG. 6 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends the length of the bottom of the primer recess and extends to at least a portion of the sidewall of the primer recess. The groove 35 may extend from 26 to 75% of the distance from the bottom of the primer recess to the top surface 36. The groove 35 may be of any depth and may be of equal or varying depth along its length or may be angled, arced, segmented (positive or negative) or other variations over a portion, segments, or regions of the groove 35. In addition, the groove 35 may be textured to further grip the overmolding. The texture may be grooves, slots, squares, knurled, hatched, etched, indentions, or other known surface texturing. The texture may be of any depth, width or spacing being regular or irregular. The texturing may be combinations of textures and/or only textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 7:
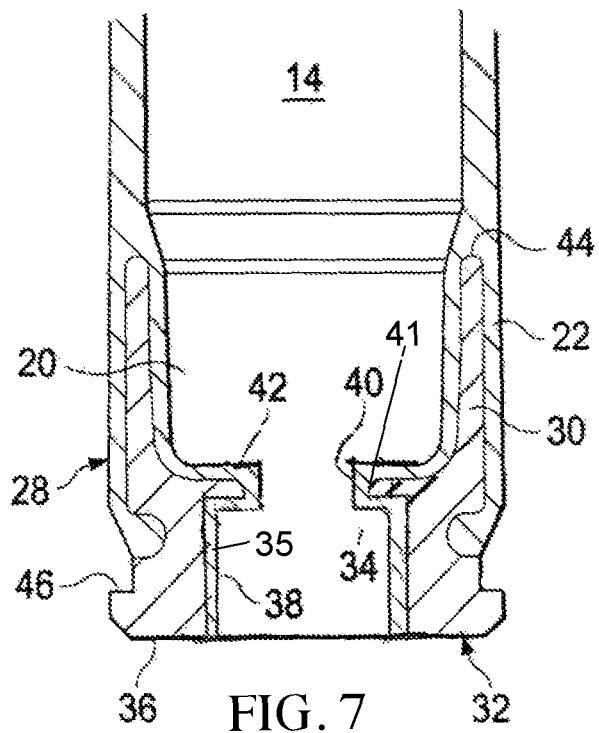
FIG. 7 depicts a side, cross-sectional view of a portion of the polymeric cartridge case according to one embodiment of the present invention.

FIG. 7 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends the length of the bottom of the primer recess and extends to at least a portion of the sidewall of the primer recess. The groove 35 may extend from 76 to 100% of the distance from the bottom of the primer recess to the top surface 36. The groove 35 may be of any depth and may be of equal or varying depth along its length or may be angled, arced, segmented (positive or negative) or other variations over a portion, segments, or regions of the groove 35. In addition, the groove 35 may be textured to further grip the overmolding. The texture may be grooves, slots, squares, knurled, hatched, etched, indentions, or other known surface texturing. The texture may be of any depth, width or spacing being regular or irregular. The texturing may be combinations of textures and/or only textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 8:
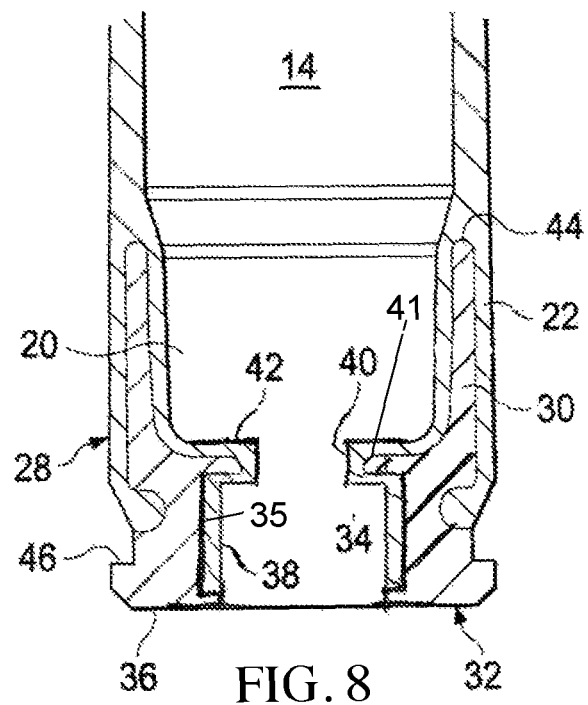
FIG. 8 depicts a side, cross-sectional view of a portion of the polymeric cartridge case according to one embodiment of the present invention.

FIG. 8 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 is positioned from the flash hole aperture 41 and extends the length of the bottom of the primer recess and extends to at least a portion of the sidewall of the primer recess. The groove 35 may extend from the bottom of the primer recess to the top surface terminating before the top surface 36. The groove 35 may be of any depth and may be of equal or varying depth along its length or may be angled, arced, segmented (positive or negative) or other variations over a portion, segments, or regions of the groove 35. In addition, the groove 35 may be textured to further grip the overmolding. The texture may be grooves, slots, squares, knurled, hatched, etched, indentions, or other known surface texturing. The texture may be of any depth, width or spacing being regular or irregular. The texturing may be combinations of textures and/or only textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

FIG. 9 depicts a side, cross-sectional view of a portion of the polymeric cartridge case displaying ribs according to one embodiment of the present invention. One embodiment that reduces bellowing of the insert includes a shortened insert and angled coupling element 30 inside of the insert. In addition, the raised portion of the polymer at the flash hole was removed, the internal polymer wall was lowered and angled to match the insert and the internal ribs were lengthened. Although FIG. 9 shows one embodiment, this embodiment will apply equally to any embodiment shown in the figures and/or known to the skilled artisan from this disclosure. For example, the polymeric cartridge case displaying ribs may be used in conjunction with the inserts shown and described in FIGS. 3-8 and variations as described herein.

A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore. Another embodiment of the instant invention is a shortened insert and angled coupling element 30 inside of the insert. In addition, raised portions of the polymer at the flash hole, lowered and angled the internal polymer wall to match the insert and lengthened the internal ribs.

FIG. 10 depicts a side, cross-sectional view of a polymeric cartridge case having a diffuser according to one embodiment of the present invention. The diffuser 50 is a device that is used to divert the affects of the primer off of the polymer and directing it to the flash hole. The affects being the impact from igniting the primer as far as pressure and heat. Although FIG. 10 shows one embodiment, this embodiment will apply equally to any embodiment shown in the figures and/or known to the skilled artisan from this disclosure. For example, the polymeric cartridge case and diffuser may be used in conjunction with the inserts shown and described in FIGS. 3-9 and variations as described herein. A cartridge 10 suitable for use with high velocity rifles is shown manufactured with a polymer casing 12 showing a powder chamber 14 with projectile (not shown) inserted into the forward end opening 16. Polymer casing 12 has a substantially cylindrical open-ended polymeric bullet-end 18 extending from forward end opening 16 rearward to the opposite end 20. The bullet-end component 18 may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provides support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The middle body component extends from a forward end opening 16 to coupling element 22. Located in the top surface 36 is a primer recess 38 that extends toward the bottom surface 34 with a diffuser 50 positioned in the primer recess 38. The diffuser 50 includes a diffuser aperture 52 that aligns with the primer flash hole 40. The diffuser 50 is a device that is used to divert the affects of the primer (not shown) off of the polymer. The affects being the impact from igniting the primer as far as pressure and heat to divert the energy of the primer off of the polymer and directing it to the flash hole.

Figure 11:
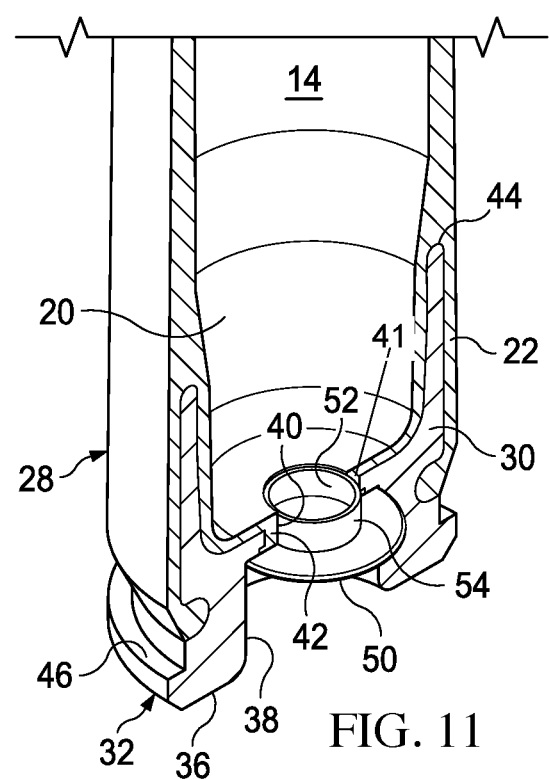
FIG. 11 depicts a side, cross-sectional view of a portion of the polymeric cartridge case having a diffuser according to one embodiment of the present invention.

FIG. 11 depicts a side, cross-sectional view of a portion of the polymeric cartridge case having a diffuser according to one embodiment of the present invention. Although FIG. 11 shows one embodiment, this embodiment will apply equally to any embodiment shown in the figures and/or known to the skilled artisan from this disclosure. For example, the polymeric cartridge case and diffuser may be used in conjunction with the inserts shown and described in FIGS. 3-9 and variations as described herein. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provides support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. Located in the top surface 36 is a primer recess 38 that extends toward the bottom surface 34 with a diffuser 50 positioned in the primer recess 38. The diffuser 50 includes a diffuser aperture 52 and a diffuser aperture extension 54 that aligns with the primer flash hole 40. The diffuser 50 is a device that is used to divert the affects of the primer (not shown) off of the polymer. The affects being the impact from igniting the primer as far as pressure and heat to divert the energy of the primer off of the polymer and directing it to the flash hole.

The diffuser 50 can be between 0.004 to 0.010 inches in thickness and made from half hard brass. For example, the diffuser 50 can be between 0.005 inches thick for a 5.56 diffuser 50. The OD of the diffuser for a 5.56 or 223 case is 0.173 and the ID is 0.080. The diffuser could be made of any material that can withstand the energy from the ignition of the primer. This would include steel, stainless, cooper, aluminum or even an engineered resin that was injection molded or stamped. The Diffuser can be produce in T shape by drawing the material with a stamping and draw die. In the T Diffuser the center ring can be 0.005 to 0.010 tall and the OD is 0.090 and the ID 0.080.

Figure 12:
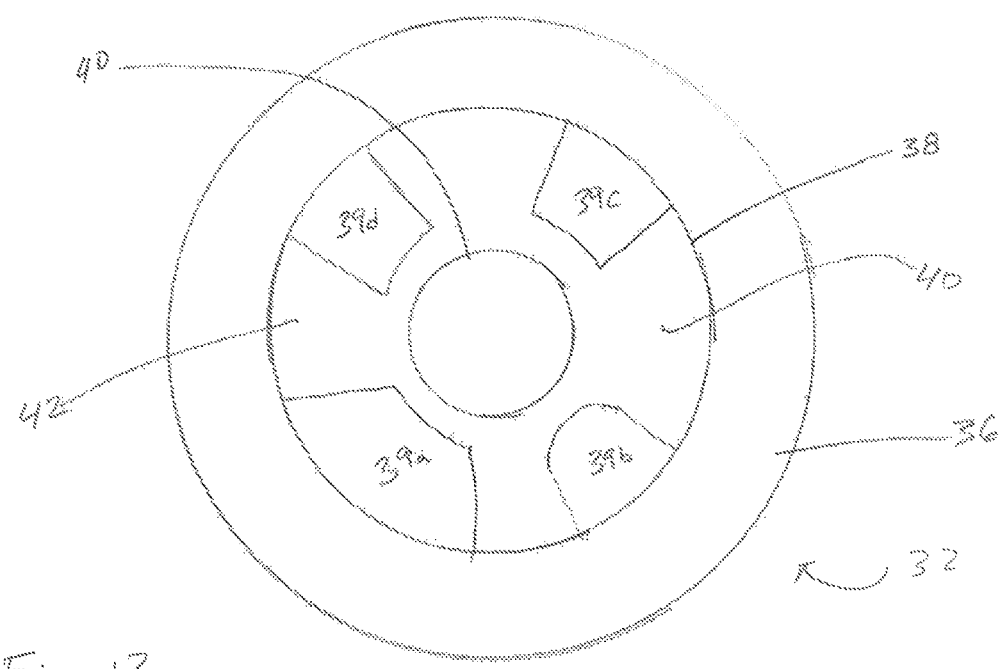
FIGS. 12-13 show a bottom view of the polymer casing.
Figure 13:
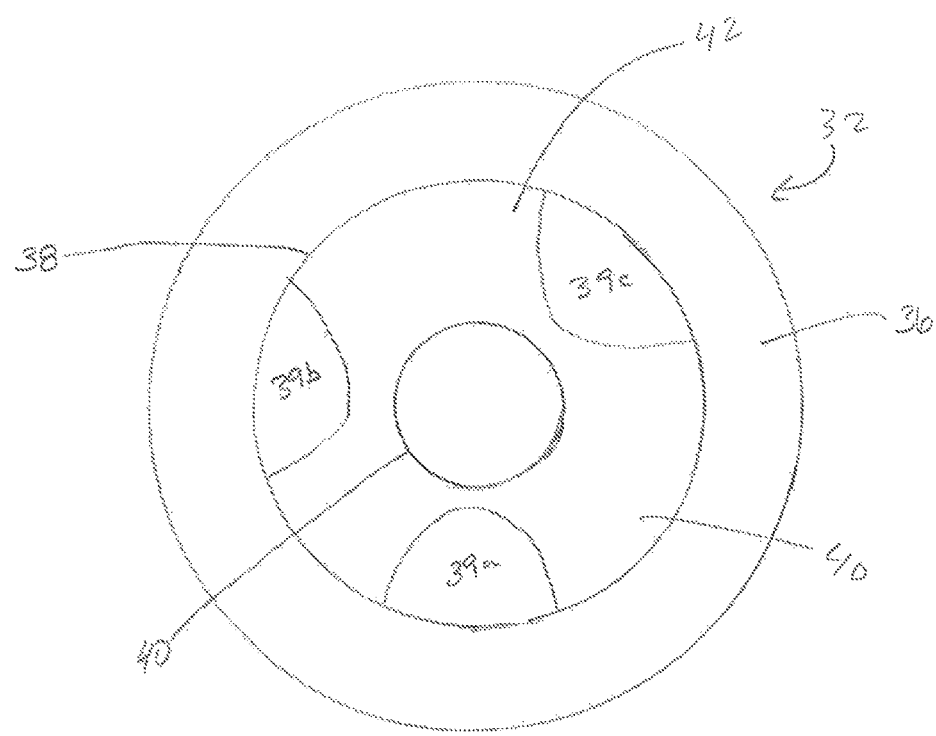

FIGS. 12-13 show a bottom view of the polymer casing. The substantially cylindrical insert 32 is shown from below showing the top surface 36 and the primer recess 38. The substantially cylindrical insert 32 has been overmolded with the polymer mid-body (not shown). The flash hole aperture (not shown) is overmolded with an aperture coating 42 (i.e., polymer overmolded) to form a primer flash hole 40. The groove (not shown) extends to the side wall (not shown) of the primer recess 38 to allow the bottom surface of the primer recess 38 to be overmolded. The bottom surface of the primer recess 38 may include raised pads 39a-39d that align to contact the primer (not shown) when inserted to allow the primer (not shown) to operate. The overmolding flows through the flash hole aperture (not shown) to the groove (not shown) and around the raised pads 39a-39d. The number, size and position of the raised pads may vary depending on the specific embodiment. For example, the raised pads 39a-39c may be 3 pads (FIG. 13) or may be 4 pads 39a-39d (FIG. 12) that align with the bottom of the primer (not shown) to provide contact and operation. The actual number and shape of the pads may number 2, 3, 4, 5, 6, 7, 8, 9 or more. The size and shape may be square, triangular, circular, trapezoidal and may have one or more curved sides. For example, the trapezoid may have curved walls to mirror the primer recess 38 and the primer flash hole 40.

FIG. 14 depicts an elevated, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component (not shown) may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A flash hole aperture 41 is located in the primer recess 38 and extends through the bottom surface 34 into the powder chamber 14. The flash hole aperture 41 is overmolded with an aperture coating 42 (i.e., polymer overmolded) to form a primer flash hole 40. A groove 35 is positioned around the flash hole aperture 41 in the primer recess 38. The groove 35 may be of any depth in the primer recess 38 and may extend away from the flash hole aperture 41 toward the primer recess wall 37 of the primer recess 38. In addition, the groove 35 may be textured to further grip the overmolding. The texture may be grooves, slots, squares, knurled, hatched, etched or other known surface texturing. The texture may be of any depth, width or spacing being regular or irregular. The texturing may be combinations of textures and/or textured in portions of the groove 35. The groove 35 receives the polymer that is overmolded over the tip 44 and through the flash hole aperture 41 into the groove 35. The groove 35 extends away from the flash hole aperture 41 to allow the overmolding of the polymer into the groove 35 and primer recess 38. The bottom surface 34 of the primer recess 38 may include raised pad 39 that align to contact the primer (not shown) when inserted into the primer recess 38 to allow the primer (not shown) to operate. The overmolding flows through the flash hole aperture 41 to the groove 35 and around the raised pad 39. The number, size and position of the raised pads may vary depending on the specific embodiment. The actual number and shape of the pads may number 2, 3, 4, 5, 6, 7, 8, 9 or more. The size and shape may be square, triangular, circular, trapezoidal and may have one or more curved sides. For example, the trapezoid may have curved walls to mirror the primer recess wall 37 and the primer flash hole 40. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

The polymeric and composite casing components may be injection molded. Polymeric materials for the bullet-end and middle body components must have propellant compatibility and resistance to gun cleaning solvents and grease, as well as resistance to chemical, biological and radiological agents. The polymeric materials must have a temperature resistance higher than the cook-off temperature of the propellant, typically about 320° F. The polymeric materials must have elongation-to-break values that to resist deformation under interior ballistic pressure as high as 60,000 psi in all environments (temperatures from about −65 to about 320° F. and humidity from 0 to 100% RH). According to one embodiment, the middle body component is either molded onto or snap-fit to the casing head-end component after which the bullet-end component is snap-fit or interference fit to the middle body component. The components may be formed from high-strength polymer, composite or ceramic.

Examples of suitable high strength polymers include composite polymer material including a tungsten metal powder, nylon 6/6, nylon 6, and glass fibers; and a specific gravity in a range of 3-10. The tungsten metal powder may be 50%-96% of a weight of the bullet body. The polymer material also includes about 0.5-15%, preferably about 1-12%, and most preferably about 2-9% by weight, of nylon 6/6, about 0.5-15%, preferably about 1-12%, and most preferably about 2-9% by weight, of nylon 6, and about 0.5-15%, preferably about 1-12%, and most preferably about 2-9% by weight, of glass fibers. It is most suitable that each of these ingredients be included in amounts less than 10% by weight. The cartridge casing body may be made of a modified ZYTEL resin, available from E. I. DuPont De Nemours Co., a modified 612 nylon resin, modified to increase elastic response.

Examples of suitable polymers include polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids. Examples of suitable polymers also include aliphatic or aromatic polyamide, polyeitherimide, polysulfone, polyphenylsulfone, poly-phenylene oxide, liquid crystalline polymer and polyketone. Examples of suitable composites include polymers such as polyphenylsulfone reinforced with between about 30 and about 70 wt %, and preferably up to about 65 wt % of one or more reinforcing materials selected from glass fiber, ceramic fiber, carbon fiber, mineral fillers, organo nanoclay, or carbon nanotube. Preferred reinforcing materials, such as chopped surface-treated E-glass fibers provide flow characteristics at the above-described loadings comparable to unfilled polymers to provide a desirable combination of strength and flow characteristics that permit the molding of head-end components. Composite components can be formed by machining or injection molding. Finally, the cartridge case must retain sufficient joint strength at cook-off temperatures. More specifically, polymers suitable for molding of the projectile-end component have one or more of the following properties: Yield or tensile strength at −65° F.>10,000 psi Elongation-to-break at −65° F.>15% Yield or tensile strength at 73° F.>8,000 psi Elongation-to-break at 73° F.>50% Yield or tensile strength at 320° F.>4,000 psi Elongation-to-break at 320° F.>80%. Polymers suitable for molding of the middle-body component have one or more of the following properties: Yield or tensile strength at −65° F.>10,000 psi Yield or tensile strength at 73° F.>8,000 psi Yield or tensile strength at 320° F.>4,000 psi.

Commercially available polymers suitable for use in the present invention thus include polyphenylsulfones; copolymers of polyphenylsulfones with polyether-sulfones or polysulfones; copolymers and blends of polyphenylsulfones with polysiloxanes; poly(etherimide-siloxane); copolymers and blends of polyetherimides and polysiloxanes, and blends of polyetherimides and poly(etherimide-siloxane) copolymers; and the like. Particularly preferred are polyphenylsulfones and their copolymers with poly-sulfones or polysiloxane that have high tensile strength and elongation-to-break to sustain the deformation under high interior ballistic pressure. Such polymers are commercially available, for example, RADEL R5800 polyphenylesulfone from Solvay Advanced Polymers. The polymer can be formulated with up to about 10 wt % of one or more additives selected from internal mold release agents, heat stabilizers, anti-static agents, colorants, impact modifiers and UV stabilizers.

The polymers of the present invention can also be used for conventional two-piece metal-plastic hybrid cartridge case designs and conventional shotgun shell designs. One example of such a design is an ammunition cartridge with a one-piece substantially cylindrical polymeric cartridge casing body with an open projectile-end and an end opposing the projectile-end with a male or female coupling element; and a cylindrical metal cartridge casing head-end component with an essentially closed base end with a primer hole opposite an open end having a coupling element that is a mate for the coupling element on the opposing end of the polymeric cartridge casing body joining the open end of the head-end component to the opposing end of the polymeric cartridge casing body. The high polymer ductility permits the casing to resist breakage.

One embodiment includes a 2 cavity prototype mold having an upper portion and a base portion for a 5.56 case having a metal insert over-molded with a Nylon 6 (polymer) based material. In this embodiment the polymer in the base includes a lip or flange to extract the case from the weapon. One 2-cavity prototype mold to produce the upper portion of the 5.56 case can be made using a stripper plate tool using an Osco hot spur and two subgates per cavity. Another embodiment includes a subsonic version, the difference from the standard and the subsonic version is the walls are thicker thus requiring less powder. This will decrease the velocity of the bullet thus creating a subsonic round.

The extracting inserts is used to give the polymer case a tough enough ridge and groove for the weapons extractor to grab and pull the case out the chamber of the gun. The extracting insert is made of 17-4 ss that is hardened to 42-45 rc. The insert may be made of aluminum, brass, cooper, steel or even an engineered resin with enough tensile strength.

The insert is over molded in an injection molded process using a nano clay particle filled Nylon material. The inserts can be machined or stamped. In addition, an engineered resin able to withstand the demand on the insert allows injection molded and/or even transfer molded.

One of ordinary skill in the art will know that many propellant types and weights can be used to prepare workable ammunition and that such loads may be determined by a careful trial including initial low quantity loading of a given propellant and the well known stepwise increasing of a given propellant loading until a maximum acceptable load is achieved. Extreme care and caution is advised in evaluating new loads. The propellants available have various burn rates and must be carefully chosen so that a safe load is devised.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A polymeric ammunition cartridge comprising:
   a primer insert comprising:
      a top surface opposite a bottom surface and a extraction flange that extends circumferentially about an outer edge of the top surface;
      a coupling element that extends from the bottom surface, wherein the coupling element is adapted to receive a polymer overmolding;
      a primer recess in the top surface that extends toward the bottom surface, wherein the primer recess comprises a recess bottom and a circular recess side wall;
      a primer flash aperture through the recess bottom that extends through the bottom surface, wherein the primer flash aperture is adapted to receive the polymer overmolding to form a flash hole;
      one or more pads positioned on the recess bottom; and
      a groove in the primer recess positioned around the primer flash aperture to extend at least partially over the recess bottom and adapted to receive the polymer overmolding;
   a substantially cylindrical polymeric middle body extending about the primer insert, wherein the substantially cylindrical polymeric middle body comprises: a substantially cylindrical polymeric bullet-end coupling element at a first end of the substantially cylindrical polymeric middle body opposite a substantially cylindrical polymeric coupling end connected by a powder chamber, wherein the substantially cylindrical polymeric coupling end extends over the substantially cylindrical coupling element and into the primer flash hole aperture and into the groove; and
   a substantially cylindrical polymeric bullet-end upper portion comprising a bullet-end coupling element connected to the substantially cylindrical polymeric bullet-end coupling element opposite a projectile aperture adapted to engage a bullet.

2. The polymeric ammunition cartridge of claim 1, wherein the one or more pads comprise 3 pads.

3. The polymeric ammunition cartridge of claim 1, wherein the one or more pads comprise 2-6 pads.

4. The polymeric ammunition cartridge of claim 1, wherein the one or more pads are positioned to align with the primer.

5. The polymeric ammunition cartridge of claim 1, wherein the one or more pads are positioned to align with an anvil of the primer.

6. The polymeric ammunition cartridge of claim 1, wherein the one or more pads are shaped to support an anvil of the primer.

7. The polymeric ammunition cartridge of claim 1 wherein the polymeric ammunition cartridge has a caliber selected from .223, .243, .25-06, .270, .300, .308, .338, .30-30, .30-06, .45-70 or .50-90, 50 caliber, 45 caliber, 380 caliber or 38 caliber, 5.56 mm, 6 mm, 7 mm, 7.62 mm, 8 mm, 9 mm, 10 mm, or 12.7 mm.

8. The polymeric ammunition cartridge of claim 1, wherein the substantially cylindrical polymeric middle body is formed from a ductile polymer, a nylon polymer or a fiber-reinforced polymeric composite.

9. The polymeric ammunition cartridge of claim 1, wherein the substantially cylindrical polymeric bullet-end upper portion comprises a ductile polymer, a nylon polymer or a fiber-reinforced polymeric composite.

10. The polymeric ammunition cartridge of claim 1, wherein the substantially cylindrical polymeric middle body comprise a polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

11. The polymeric ammunition cartridge of claim 1, wherein the substantially cylindrical polymeric bullet-end upper portion comprise a polymers selected from the group consisting of polyurethane prepolymer, cellulose, fluoropolymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

12. The polymeric ammunition cartridge of claim 1, wherein the substantially cylindrical polymeric bullet-end and the substantially cylindrical polymeric bullet-end upper portion are welded or bonded together.

13. The polymeric ammunition cartridge of claim 1, wherein the projectile aperture further comprises a mechanical interlock adapted to mate to a groove on a bullet.

14. The polymeric ammunition cartridge of claim 1, wherein the substantially cylindrical polymeric bullet-end coupling element is welded or bonded to the substantially cylindrical polymeric bullet-end upper portion.

15. The polymeric ammunition cartridge of claim 1, wherein the primer insert comprises a polymer, a metal, an alloy, or a ceramic alloy.

16. The polymeric ammunition cartridge of claim 1, wherein the primer insert comprises steel, nickel, chromium, copper, carbon, iron, stainless steel or brass.

17. The polymeric ammunition cartridge of claim 1, wherein the primer insert comprises 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel or Ti6A14V.

* * * * *